United States Patent
Siomina

(10) Patent No.: US 9,445,340 B2
(45) Date of Patent: Sep. 13, 2016

(54) ENSURING POSITIONING QUALITY-OF-SERVICE FOR LTE POSITIONING

(71) Applicant: Iana Siomina, Solna (SE)

(72) Inventor: Iana Siomina, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 358 days.

(21) Appl. No.: 13/700,765

(22) PCT Filed: Sep. 18, 2012

(86) PCT No.: PCT/IB2012/054941
§ 371 (c)(1),
(2) Date: Nov. 29, 2012

(87) PCT Pub. No.: WO2013/150344
PCT Pub. Date: Oct. 10, 2013

(65) Prior Publication Data
US 2014/0080506 A1 Mar. 20, 2014

Related U.S. Application Data

(60) Provisional application No. 61/619,543, filed on Apr. 3, 2012.

(51) Int. Cl.
*H04W 24/00* (2009.01)
*H04W 36/32* (2009.01)
(Continued)

(52) U.S. Cl.
CPC ............ *H04W 36/32* (2013.01); *G01S 5/0036* (2013.01); *H04W 36/30* (2013.01); *H04W 64/00* (2013.01)

(58) Field of Classification Search
CPC .. H04W 64/00; H04W 4/02; H04L 29/08657
USPC ............ 455/456.1, 404.2, 436, 414.1, 422.1
See application file for complete search history.

(56) References Cited

U.S. PATENT DOCUMENTS

2006/0187858 A1* 8/2006 Kenichi et al. ............... 370/254
2007/0243885 A1 10/2007 Shim et al.
(Continued)

FOREIGN PATENT DOCUMENTS

| CN | 101998627 A | 3/2011 |
| WO | 2011017898 A1 | 2/2011 |
| WO | 2011126419 A1 | 10/2011 |

OTHER PUBLICATIONS

3rd Generation Partnership Project. 3GPP TS 36.305 V10.3.0 (Sep. 2011). 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 10). pp. 1-51, Sep. 2011.

(Continued)

*Primary Examiner* — Nghi H Ly
(74) *Attorney, Agent, or Firm* — Murphy, Bilak & Homiller, PLLC

(57) ABSTRACT

Methods in a radio network node for obtaining positioning QoS information and using the positioning QoS information, as well as corresponding radio network node apparatus, are disclosed. An example method begins with the receiving (220) of positioning QoS information for a target wireless device, such as a user equipment, UE. In some cases, for example, the positioning QoS information is received from a positioning node, using the LPPa protocol. The positioning QoS information may include, for example, a desired horizontal accuracy, a desired vertical accuracy, and a target response time. The received positioning QoS information is used (230) to configure uplink transmissions to be transmitted by the target wireless device, or to configure a receiver for reception of one or more uplink transmissions from the target wireless device, or both.

33 Claims, 3 Drawing Sheets

(51) Int. Cl.
*H04W 36/30* (2009.01)
*G01S 5/00* (2006.01)
*H04W 64/00* (2009.01)

(56) References Cited

U.S. PATENT DOCUMENTS

| | | |
|---|---|---|
| 2009/0036146 A1* | 2/2009 | Lamba et al. ............. 455/456.3 |
| 2009/0066564 A1 | 3/2009 | Burroughs et al. |
| 2010/0041418 A1* | 2/2010 | Edge et al. ................ 455/456.2 |
| 2010/0322185 A1 | 12/2010 | Park et al. |
| 2011/0077007 A1 | 3/2011 | Kim et al. |
| 2011/0183672 A1 | 7/2011 | Jeong et al. |
| 2011/0207477 A1 | 8/2011 | Siomina et al. |
| 2012/0020320 A1 | 1/2012 | Issakov et al. |

OTHER PUBLICATIONS

3rd Generation Partnership Project. "SRS update support in NBPS for LTE." 3GPP TSG-RAN2 Meeting #77bis, R2-121127, Mar. 26-30, 2012, Jeju, Korea.

3rd Generation Partnership Project. "LS on Uplink Positioning Reset Procedure." 3GPP TSG RAN WG2 meeting #77bis, R2-121954, Mar. 26-30, 2012, Jeju, Korea.

3rd Generation Partnership Project. "UTDOA support of Reset Procedure."3GPP TSG-RAN WG3 Meeting #76, R3-120954, May 21-26, 2012, Prague, Czech Republic.

Siomina, I. "Ensuring Positioning Quality-of-Service During Cell Changes." Currently Pending U.S. Appl. No. 13/700,823, filed Nov. 29, 2012.

3rd Generation Partnership Project. "On UL Positioning Parameters." 3GPP TSG-RAN WG4 Meeting #63, R4-123063, May 21-25, 2012, Prague, Czech Republic.

3rd Generation Partnership Project. 3GPP TS 29.171 V11.1.0 (Mar. 2012). 3rd Generation Partnership Project; Technical Specification Group Core Network and Terminals; Location Services (LCS); LCS Application Protocol (LCS-AP) between the Mobile Management Entity (MME) and Evolved Serving Mobile Location Centre (E-SMLC);SLs interface (Release 11). Mar. 2012.

3rd Generation Partnership Project. "Network Based Positioning Support." 3GPP TSG-RAN WG2 Meeting #77, R2-121030, Dresden, Germany Feb. 6-10, 2012.

3rd Generation Partnership Project. "[Draft] LS response on UL positioning parameters." 3GPP TSG RAN WG4 meeting #63, R4-123065, Prague, Czech Republic, May 21-25, 2012.

* cited by examiner

ENSURING POSITIONING QUALITY-OF-SERVICE FOR LTE POSITIONING

TECHNICAL FIELD

The present invention relates generally to wireless communication networks and in particular to networks performing positioning measurements on uplink radio signal transmissions from wireless devices.

BACKGROUND

The development of technologies to determine the position of a mobile device has enabled application developers and wireless network operators to provide location-based and location-aware services. Examples of these are guiding systems, shopping assistance, friend finder, presence services, community and communication services and other information services that give the mobile user information about his or her surroundings or that use this information to enhance their services.

In addition to the commercial services facilitated by these technologies, location-based emergency services are also being deployed. The governments in several countries have put specific requirements on the network operators to be able to determine the position of an emergency call. For instance, governmental requirements in the United States specify that mobile networks must be able to determine the position of a certain percentage of all emergency calls and further include accuracy requirements. The requirements make no distinctions between indoor and outdoor environment.

In many environments, the position can be accurately estimated by using positioning methods based on Global Navigation Satellite Systems (GNSS), such as the well-known Global Positioning System (GPS). However, GPS-based positioning may often have unsatisfactory performance, especially in urban and/or indoor environments. Complementary positioning methods may also be provided by a wireless network to augment GPS technology. In addition to mobile terminal-based GNSS (including GPS), the following methods are currently available or will be soon be included in the Long-Term Evolution (LTE) standards developed by the $3^{rd}$-Generation Partnership Project (3GPP):

Cell ID (CID),
E-CID, including network-based AoA,
Assisted-GNSS (A-GNSS), including Assisted-GPS (A-GPS), based on satellite signals,
Observed Time Difference of Arrival (OTDOA),
Uplink Time Difference of Arrival (UTDOA)—being currently standardized.

Several positioning techniques are based on time-difference-of-arrival (TDOA) or time-of-arrival (TOA) measurements. Examples include OTDOA, UTDOA, GNSS, and Assisted-GNSS (A-GNSS). A typical, though not the only, format for the positioning result with these techniques is an ellipsoid point with an uncertainty circle/ellipse/ellipsoid, which is the result of intersection of multiple hyperbolas/hyperbolic arcs (e.g., OTDOA or UTDOA) or circles/arcs (e.g., UTDOA, GNSS, or A-GNSS).

Several techniques, such as Adaptive Enhanced Cell Identity (AECID), may involve a mix of any of the methods above, and are thus regarded as "hybrid" positioning methods. With these methods, the position result can be almost any shape, but in many cases it is likely to be a polygon.

Cellular-based positioning methods (as opposed to satellite-based methods, for example) rely on knowledge of anchor nodes' locations, i.e., the fixed locations from which measured signals are transmitted (e.g., for OTDOA) or the fixed locations at which signals transmitted by mobile devices are measured (e.g., for UTDOA). These fixed locations may correspond, for example, to base station or beacon device locations for OTDOA, Location Measurement Unit (LMU) antenna locations for UTDOA, and base station locations for E-CID. The anchor nodes' location may also be used to enhance AECID, hybrid positioning, etc.

Uplink Positioning

In 3GPP, location-based services are known as Location Services (LCS). Three key network elements in an LTE positioning architecture are the LCS Client, the LCS target and the LCS Server. The LCS Server is a physical or logical entity that manages positioning for a LCS target device by collecting measurements and other location information, assists the target device in measurements when necessary, and estimating the LCS target location. A LCS Client is a software-based and/or hardware entity that interacts with a LCS Server for the purpose of obtaining location information for one or more LCS targets, i.e., the entities being positioned. LCS Clients may reside in a network node, an external node (i.e., a network external to a cellular network), a Public Safety Access Point (PSAP), a user equipment (or "UE," 3GPP terminology for an end-user wireless station), a radio base station, etc. In some cases, the LCS Client may reside in the LCS target itself. An LCS Client (e.g., an external LCS Client) sends a request to LCS Server (e.g., a positioning node) to obtain location information. The LCS Server processes and services the received requests and sends the positioning result (sometimes including a velocity estimate) to the LCS Client.

In some cases, the position calculation is conducted by a positioning server, such as an Enhanced Serving Mobile Location Center (E-SMLC) or a Secure User-Plane Location (SUPL) Location Platform (SLP) in LTE. In other cases, the position calculation is carried out by the UE. The latter approach is known as the UE-based positioning mode, while the former approach includes both network-based positioning, i.e., position calculation in a network node based on measurements collected from network nodes such as LMUs or eNodeBs, and UE-assisted positioning, where the position calculation in the positioning network node is based on measurements received from UE.

LTE Positioning Protocol (LPP) is a positioning protocol for control plane signaling between a UE and an E-SMLC, which is used by the E-SMLC to provide assistance data to the UE and by the UE for reporting measurements to the E-SMLC. LPP has been designed in such a way that it can also be utilized outside the control plane domain such as in the user plane in the context of SUPL. LPP is used for DL positioning.

LTE Positioning Protocol Annex (LPPa, also known as LTE Positioning Protocol A) is a protocol between the eNodeB and the E-SMLC, and is specified only for control-plane positioning procedures, although it still can assist user-plane positioning by querying eNodeBs for information (e.g., PRS configuration in a cell for OTDOA or UE SRS configuration for UTDOA) and/or eNodeB measurements. LPPa may be used for DL positioning and UL positioning.

FIG. 1 illustrates the UTDOA architecture currently under discussion in 3GPP, including nodes found in the Radio Access Network (RAN) and the core network, as well as an external LCS Client. Although uplink (UL) measurements may in principle be performed by any radio network node, such as the illustrated LTE eNodeB 110, the UL positioning architecture also includes specific UL measurement units, known as Location Measurement Units (LMUs), which are logical and/or physical nodes that measure signals transmitted by a target UE, such as the UE 130 illustrated in FIG. 1. Several LMU deployment options are possible. For example, referring to FIG. 1, LMU 120*a* is integrated into eNodeB 110, while LMU 120*b* shares some equipment, e.g., at least antennas, with eNodeB 110. LMU 120*c*, on the other hand, is a standalone physical node comprising its own radio components and antenna(s).

While the UTDOA architecture is not finalized, there will likely be communication protocols established for communications between a LMU and positioning node, and there may be some enhancements to support UL positioning added to the existing Location Position Protocol Annex (LPPa) or to similar protocols. LPPa is a protocol between an eNodeB and an LCS Server specified only for control-plane positioning procedures, although it can be used to assist user-plane positioning by querying eNodeBs for information and eNodeB measurements.

In particular, a new interface between the E-SMLC and LMU is being standardized for uplink positioning. This interface, known as SLm, is terminated between a positioning server, e.g., the E-SMLC 140 pictured in FIG. 1, and an LMU. It is used to transport messages according to the SLmAP protocol, a new protocol being specified for UL positioning, between the E-SMLC and the LMU. SLmAP can be used to provide assistance data to an LMU, as discussed in further detail below. This protocol may also be used by the LMU to report to the E-SMLC results of measurements on radio signals performed by the LMU. The SLmAP protocol was previously referred to as the LMUp protocol; thus is should be understood that references herein to SLmAP are referring to a developing protocol referred to as LMUp elsewhere.

In LTE, UTDOA measurements, known as UL relative time-of-arrival (RTOA) measurements, are performed on Sounding Reference Signals (SRS). To detect an SRS signal, an LMU 120 needs a number of SRS parameters to generate an SRS sequence that is correlated against the received signal. These parameters are not necessarily known to LMU 120. Thus, to allow the LMU to generate the SRS sequence and detect the SRS signals transmitted by a UE, SRS parameters must be provided in the assistance data transmitted by the positioning node to LMU; these assistance data would be provided via SLmAP. However, the SRS parameters are also generally unknown to the positioning node, which therefore must obtain this information from the eNodeB that configured the target UE to perform the SRS transmissions to be measured by the LMU; this information would have to be provided to the positioning node via LPPa or a similar protocol.

The specific contents of the assistance data provided to LMUs by a positioning node, over SLmAP, are currently being discussed in 3GPP. One intention of the assistance data is to indicate the SRS configuration for the uplink signals that the LMUs will measure. One example of the specific assistance data that might be provided to an LMU by a positioning node, using SLmAP, is shown in Table 1. This assistance data, which can be based on information provided to the E-SMLC by an eNodeB, can be used by the LMU to configure UL RTOA measurements, for example.

TABLE 1

| Parameter Category | Parameters |
|---|---|
| General | C-RNTI |
|  | Serving eNB eCGI, PCI |
|  | UL-EARFCN |
|  | Cyclic prefix Config |
|  | UL-Bandwidth |
| SRS | Bandwidth |
|  | Sub-frame configuration |
|  | Frequency domain position |
|  | Cyclic shift |
|  | Duration |
|  | Transmission comb |
|  | Configuration index |
|  | MaxUpPts |

Since the eNodeB is configuring UE transmissions in general, including the SRS transmissions, it has to communicate to the positioning node the configuration information for the UL transmissions to be measured for UL positioning. It has been proposed that the same configuration information signaled to LMUs by the positioning node is proposed to be also signaled from the eNodeB to the E-SMLC.

Measurements for UL positioning and UTDOA are performed on UL transmissions, which may include, for example, reference signal transmissions or data channel transmissions. UL RTOA is the currently standardized UTDOA timing measurement, and may be performed on Sounding Reference Signals (SRS). The results of the measurements are signaled by the measuring node (e.g., LMU) to the positioning node (e.g., E-SMLC), e.g., over SLmAP.

A positioning result is a result of processing of obtained measurements, including Cell IDs, power levels, received radio signal strengths or quality, etc. The positioning result is often based on radio measurements (e.g., timing measurements such as timing advance and RTT or power-based measurements such as received signal strength) received from measuring radio nodes (e.g., UE or eNodeB or LMU).

The positioning result may be exchanged among nodes in one of several pre-defined formats. The signaled positioning result is represented in a pre-defined format, e.g., corresponding to one of the seven Universal Geographical Area Description (GAD) shapes. Currently, a positioning result may be signaled between:

- an LCS target, e.g., a UE, and an LCS server, e.g., over LPP protocol;
- two positioning nodes, e.g., an E-SMLC or SLP, e.g., over a proprietary interface;
- a positioning server (such as an E-SMLC,) and other network nodes, e.g., a Mobility Management Entity (MME), a Mobile Switching Center (MSC), a Gateway Mobile Location Center (GMLC), an Operations and Maintenance (O&M) node, a Self-Organizing Network (SON) node, and/or a Minimization of Drive Tests (MDT) node;
- a positioning node and an LCS Client, e.g., between an E-SMLC and a Public Safety Access Point (PSAP), or between an SLP and an External LCS Client, or between an E-SMLC and a UE.

Note that in emergency positioning, the LCS Client may reside in a PSAP.

The LCS positioning quality in a positioning result is controlled by target quality requirements known as positioning quality-of-service (QoS), LCS QoS, or target LCS QoS. Positioning QoS may be described by any one or more of: a target horizontal uncertainty, a target vertical uncertainty, and a target response time. The uncertainty information, either horizontal or vertical, typically comprises an accuracy level and a corresponding confidence level.

The specific LCS QoS for a given positioning event depends on the service that is requesting positioning. There may also be pre-defined QoS configurations for specific LCS Client Types and/or LCS Service Types. The LCS QoS may be signaled by a LCS Client to other nodes. In LTE, an E-SMLC may receive this information from an MME, which in turn may receive it from GMLC.

For positioning techniques based on downlink measurements, the LCS QoS is communicated to a UE performing positioning measurements. More specifically, in the existing LTE specifications, it is signaled from E-SMLC to UE over LPP in the commonIEsRequestLocationInformation element to control UE-based positioning (i.e., when the positioning result is calculated by the UE; currently, for LTE there is only one standardized UE-based positioning method—A-GNSS) and it is essentially the information received by E-SMLC in a positioning request for the UE. The specifications require that QoS requirements shall be met by the target device to the degree possible. However, it is permitted to return a response that does not fulfill all QoS requirements, if some were not attainable. The single exception to this is the response-time requirement, which must always be fulfilled—even if that means not fulfilling other QoS requirements.

As mentioned above, the LCS QoS is also communicated between network nodes, in addition to being communicated to the UE for downlink UE-based positioning. The positioning node (e.g., the E-SMLC for control-plane positioning) receives a positioning request in an LCS-AP request message from the MME. This message is sent by the MME to request a location estimate for a target UE and contains sufficient information, including LCS QoS information, to enable location according to the target QoS, using any positioning method supported. The message is also used to request LCS assistance data transfer to a UE. This message is specified in the 3GPP document "Location Services (LCS); LCS Application Protocol (LCS-AP) between the Mobile Management Entity (MME) and Evolved Serving Mobile Location Centre (E-SMLC); SLs interface," 3GPP TS 29.171, v. 11.1.0 (March 2012), available at www.3gpp.org. In particular, this Location Request Message includes LCS QoS parameters, which may specify horizontal accuracy, vertical accuracy and allowed response time for the requested positioning.

Positioning measurements are complicated by the recent development of multi-carrier techniques for cellular networks. A multi-carrier system, alternatively called a carrier aggregation (CA) system, allows a UE to simultaneously receive and/or transmit data over more than one distinct and separately configured carrier frequency. Each carrier frequency is often referred to as a component carrier (CC) or is referred to simply as a serving "cell" in the serving sector. More specifically, an individual carrier may be referred to as a primary serving cell or a secondary serving cell.

The multi-carrier concept is used in both High-Speed Packet (HSPA) systems and LTE systems. Carrier aggregation, or CA, is supported for both contiguous and non-contiguous component carriers. Carriers originating from the same eNodeB need not to provide the same coverage. Carriers in a multi-carrier system may also belong to different radio access technologies (RATs).

For a UE in RRC_CONNECTED mode that is not configured with CA, there is only one serving cell comprising of the primary cell. For a UE in RRC_CONNECTED mode and configured with carrier aggregation, the term "serving cells" is used to denote the set of one or more cells configured for the UE, which include the primary cell and all secondary cells.

The primary cell (PCell) is a configured cell, operating on the primary carrier frequency, also referred to as the primary component carrier (PCC), in which the UE either performs the initial connection establishment procedure or initiates the connection re-establishment procedure, or the cell indicated as the primary cell in the handover procedure. A secondary cell (SCell) is a cell, operating on a secondary carrier frequency, also referred to as a secondary component carrier (SCC), which may be configured after an RRC connection is established, and which may be used to provide additional radio resources in either the uplink or downlink directions, or both.

In the downlink, the carrier corresponding to the PCell is the Downlink Primary Component Carrier (DL PCC), while in the uplink it is the Uplink Primary Component Carrier (UL PCC). Depending on UE capabilities, SCells can be configured to form, together with the PCell, a set of serving cells. In the downlink, the carrier corresponding to an SCell is a Downlink Secondary Component Carrier (DL SCC), while in the uplink it is an Uplink Secondary Component Carrier (UL SCC). A set of configured serving cells in CA always includes one PCell and one or more SCells. The configured sets may be different in DL and UL.

In a CA system, the base station (e.g., eNode B) in LTE can selectively activate and deactivate one or more secondary cells on the corresponding secondary carriers. Thus, a secondary carrier may be selectively configured and deconfigured, and an activated secondary carrier may be selectively activated and deactivated. The UE may perform measurements on configured but not activated SCCs; however, the UE can transmit only on configured and activated SCCs. SCCs may be activated and deactivated dynamically. The activation and deactivation is done by the eNodeB using lower layer signaling (e.g., over PDCCH in LTE) using a short command such as ON/OFF, e.g., using 1 bit for each SCell. The activation/deactivation command is sent to the UE via the PCell. Typically deactivation is done when there is no data to transmit on the SCell(s). The activation/deactivation can be done independently on uplink and downlink SCell. One purpose of the deactivation is to enable UE battery saving.

While current standards for LTE specify signaling of the LCS QoS information to E-SMLC in a positioning request and the use by the UE of LCS QoS information for UE-based positioning (which is DL positioning performed by the UE), improvements are still needed for the handling and use of QoS information for LTE positioning, particularly for uplink positioning techniques.

SUMMARY

With uplink (UL) positioning as it is currently defined in the 3GPP standards for LTE, it is not possible to signal the LCS QoS to an eNodeB, e.g., over LPPa. More generally, the use of LCS QoS information by nodes not calculating geographical location of a UE is not specified in 3GPP. Further, there is currently no possibility to provide the LCS QoS for a given positioning task to a radio network node at all. In addition, there are presently no techniques for using the LCS QoS information in the radio network node. Even further, there are currently no techniques for ensuring positioning QoS during a cell change, in either carrier-aggregation (CA) systems or non-CA systems.

Described below are technical solutions to address one or more of these issues. These solutions include methods in a radio network node for obtaining the LCS QoS information, methods in the radio network node for using the LCS QoS information, and corresponding network nodes.

An example method according to several embodiments of the present invention is for assisting positioning of a target wireless device, such as a UE, and might be implemented in a radio network node, such as an eNodeB or an LMU. This method optionally begins with a request for positioning QoS information for target wireless device. This request may be sent, for example, to a positioning node, such as an E-SMLC or an SLP. However this request is not necessarily sent by every radio network node configured according to embodiments of this invention, nor is it necessarily sent for every positioning transaction in radio network nodes that are configured to at least sometimes send this request.

The example method continues (or begins, in the event that no previous request has been sent) with the receiving of positioning QoS information for the target wireless device. At least in the context of LTE, the positioning QoS information may be identical to LCS QoS information associated with an LCS positioning session, or may be directly derived from it. The positioning QoS information may be received from any one of several nodes, such as a positioning node, a core network node, another radio network node, the target wireless device, or a second wireless device. In some cases, for example, the positioning QoS information is received from a positioning node, using the LPPa protocol or SLmAP protocol. In some cases, the positioning QoS information is included in an information element or a message associated with uplink positioning. In some of these and in some other cases, the positioning QoS information is received in a message that requests or indicates a need for delivery of UE transmission configuration data to a positioning node. The positioning QoS information may include any one or more of the following, for example: a desired horizontal accuracy; a desired vertical accuracy; a confidence level corresponding to horizontal accuracy; a confidence level corresponding to vertical accuracy; a maximum response time; a target response time; a maximum measurement time; a target measurement time; a positioning client type; and a positioning service type.

The received positioning QoS information may be used to configure uplink transmissions to be transmitted by the target wireless device, or to configure a receiver for reception of one or more uplink transmissions from the target wireless device, or both. In some cases, one or more parameters are received by the radio network node in addition to the positioning QoS information, such as parameters specifying specific time resources, specific frequency-domain resources, component carrier information, RAT information, and/or maximum measurement bandwidth information. In some of these embodiments, the configuring of the one or more uplink transmissions or the configuring of the receiver is further based on these one or more additional parameters.

In some embodiments, the configuring of one or more uplink transmissions that are to be transmitted by the target wireless device includes configuring a reference signal transmission, such as a sounding reference signal (SRS) transmission. In some of these and in other embodiments, a data transmission is configured. Configuring the reference signal transmission may include, for example, scheduling the reference signal transmission, or configuring one or more of the following for the reference signal transmission: a transmission bandwidth or frequency; a duplex mode configuration; a cyclic prefix; a number of antenna ports; a frequency hopping configuration; a subframe configuration; a transmission comb; a reference signal sequence; a parameter indicative of reference signal periodicity; a reference signal cyclic shift; a parameter related to the sequence hopping; a reference signal scrambling code; and a reference signal configuration index.

In some of these and in some other embodiments, the configuring of one or more uplink transmissions or the configuring of a receiver to receive uplink transmissions is based on a pre-defined rule that takes into account the received positioning QoS information. This pre-defined rule defines one or more of the following, in some embodiments: a transmission bandwidth, a measurement bandwidth, a transmission periodicity, a transmission time, a number of transmission samples for measurements, and a pre-defined transmission configuration. In some of these and in still other embodiments, the configuring of one or more uplink transmissions further includes adaptively scheduling an uplink transmission or a downlink transmission that causes an uplink transmission at a pre-defined time. The new or updated (re)configuration information of the UL transmissions in one or more cells for one or more wireless devices may be further provided to another node such as a positioning node.

In some embodiments that involve configuring a receiver for reception of one or more uplink transmissions that are transmitted by the target wireless device, uplink transmission configuration information is sent to a measuring node. This may be the case, for example, where the positioning QoS is received by an eNodeB and is used to configure a separate measuring node, such as an LMU, to receive uplink transmissions from the target wireless device. Whether or not the radio network node is configuring its own receiver or a separate receiver, however, the configuration may involve any of the following, in some embodiments: scheduling reception of one or more of the uplink transmissions; providing uplink signal information associated with the uplink transmission; rescheduling reception of one or more of the uplink transmissions; configuring a reception bandwidth or frequency; and/or configuring a measurement bandwidth or frequency.

Some, but not all, methods according to this example further include performing one or more additional actions, based on the received positioning QoS information. Examples of these additional actions include: interference coordination, initiating handover of a UE or carrier switching of a UE, sending uplink transmission configuration information to a measuring node or to another network node, and reporting a change in uplink transmission configuration to a another network node.

Radio network node apparatus and a positioning node adapted to carry out any of the techniques summarized above, and variants thereof, are also disclosed in the detailed discussion that follows. Of course, the present invention is not limited to the above-summarized features and advantages. Indeed, those skilled in the art will recognize additional features and advantages upon reading the following detailed description, and upon viewing the accompanying drawings.

DETAILED DESCRIPTION

Figure 1:
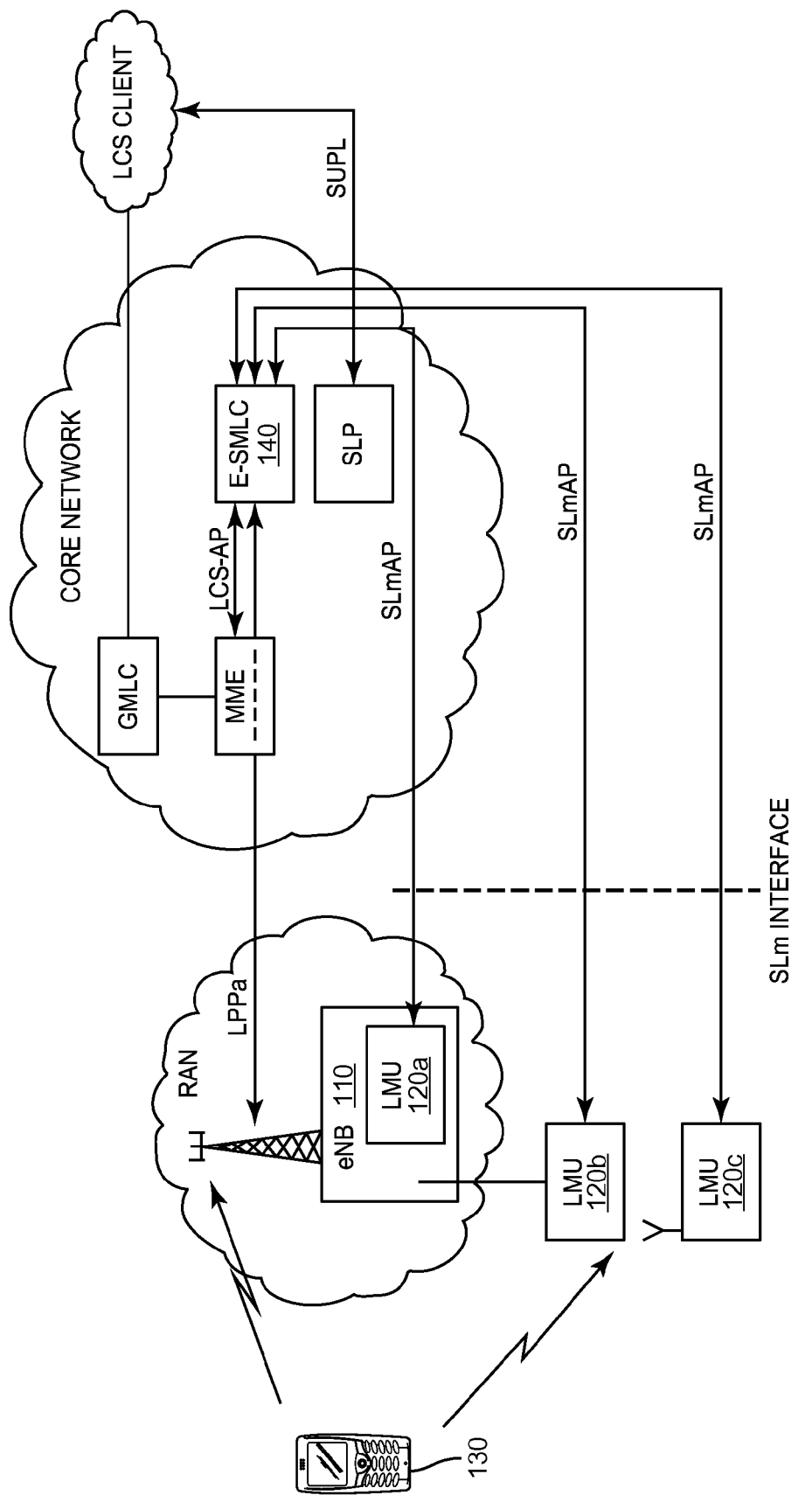
FIG. 1 illustrates several nodes in an example network configured according to the LTE positioning architecture.

Note that although terminology from 3GPP LTE is used in this disclosure to exemplify the invention, this should not be seen as limiting the scope of the invention to LTE systems or systems using the LTE Radio Access Technology (RAT). Other wireless systems, including those based on WCDMA, WiMAX, UMB and GSM, may also benefit from exploiting the ideas covered within this disclosure. Furthermore, the inventive techniques disclosed herein are not limited to single-RAT systems, but may also be applied in the multi-RAT context. Some other RAT examples are LTE-Advanced, UMTS, HSPA, GSM, cdma2000, WiMAX, and WiFi.

Still further, the techniques and apparatus described herein may be considered as standalone embodiments or may be used in any combination with each other, unless their descriptions herein clearly indicate otherwise.

The terms "wireless device" and "UE" are used interchangeably in the description that follows. A UE may comprise any device equipped with a radio interface and capable of at least generating and transmitting a radio signal to a radio network node. Note that some radio network nodes, e.g., a femto base station, or "home base station," may be equipped with a UE-like interface, and in some cases may need to be positioned in the same manner as UEs are positioned. Examples of UEs that are to be understood in a general sense are wireless PDAs, wireless-equipped laptop computers, mobile telephones, wireless sensors, fixed relay nodes, mobile relay nodes, and any radio network node equipped with a UE-like interface (e.g., small RBS, eNodeB, femto BS).

A "radio node" is characterized by its ability to transmit and/or receive radio signals, and comprises at least a transmitting or receiving antenna. A radio node may be a UE or a radio network node. Some examples of radio nodes are a radio base station (e.g., eNodeB in LTE or NodeB in UTRAN), a relay, a mobile relay, a remote radio unit (RRU), a remote radio head (RRH), a wireless sensor, a beacon device, a measurement unit capable of transmitting downlink signals (e.g., LMUs), a user terminal, a wireless PDA, a mobile telephone, a smartphone, a wireless-equipped laptop, etc.

A "radio network node" is a radio node in a radio communications network and is typically characterized by having its own network address. For example, a mobile device in a cellular network may have no network address, but a wireless device involved in an ad hoc network is likely to have a network address. A radio node may be capable of operating or receiving radio signals or transmitting radio signals in one or more frequencies, and may operate in single-RAT, multi-RAT or multi-standard mode (e.g., an example dual-mode user equipment may operate with any one or combination of WiFi and LTE or HSPA and LTE/LTE-A). A radio network node, including eNodeB, RRH, RRU, LMU, or transmitting-only/receiving-only nodes, may or may not create own cell. It may also share a cell with another radio node which creates own cell. More than one cell may be associated with one radio node. Further, one or more serving cells (in DL and/or UL) may be configured for a UE, e.g., in a carrier aggregation system where a UE may have one Primary Cell (PCell) and one or more Secondary Cells (SCells).

A "network node" may be a radio network node or a core network node. Some non-limiting examples of a network node are an eNodeB, a Radio Network Controller (RNC), a positioning node, an MME, a PSAP, a SON node, an MDT node, and an O&M node. A "coordinating node," as described below may be but is not necessarily a network node.

A "positioning node" as described in several embodiments herein is a node that has positioning functionality. For example, for LTE it may be understood as a positioning platform in the user plane (e.g., SLP in LTE) or a positioning node in the control plane (e.g., E-SMLC in LTE). An SLP may also consist of a SUPL Location Center (SLC) and a SUPL Positioning Center (SPC), where the SPC may also have a proprietary interface with E-SMLC. Positioning functionality may also be split among two or more nodes. For example, there may be a gateway node between LMUs and E-SMLC, where the gateway node may be a radio base station or another network node; in this case, the term "positioning node" may relate to E-SMLC and the gateway node. In a testing environment, a positioning node may be simulated or emulated by test equipment.

The term "coordinating node" as used herein is a network and/or node that coordinates radio resources with one or more radio nodes. Examples of a coordinating node are a network monitoring and configuration node, an OSS node, an O&M node, an MDT node, a SON node, a positioning node, an MME, a gateway node such as Packet Data Network Gateway (P-GW) or Serving Gateway (S-GW) network node or femto gateway node, a macro node coordinating smaller radio nodes associated with it, an eNodeB coordinating resources with other eNodeBs, etc.

The signaling described below in connection with various embodiments of the invention is either via direct links or logical links (e.g., via higher layer protocols and/or via one or more network and/or radio nodes). For example, signaling from a coordinating node may pass through another network node, e.g., a radio network node.

The technical embodiments described herein are described primarily in the context of uplink (UL) positioning, i.e., positioning techniques based on measurements of uplink transmissions. The most typical example of such a positioning method is UTDOA, but the techniques described herein may be applied to other UL positioning approaches as well. UL measurements may be timing measurements (e.g., time of arrival, UE Rx-Tx, eNodeB Rx-Tx, RTT, propagation delay, time-difference of arrival) or power-based measurements (e.g., received signal strength or received signal quality).

A "configuring node" as described in at least some embodiments herein is a radio network node that configures UL transmissions for a UE, typically the serving cell (or PCell) node. A "measuring node" (sometimes referred to as an "assisting radio node") as described in at least some embodiments herein is a radio network node that performs UL measurements on the configured UL transmissions for the UE. Note that a configuring node may also be a measuring node.

For UL positioning, a positioning node typically requests or indicates a need for a configuring node (typically a serving cell) to provide information about UL transmissions for one or more wireless devices and/or to configure the UL transmissions, e.g., when not yet configured. The positioning node selects a set of measuring nodes for positioning a UE, and provides to them the information necessary for configuring measurement on the UL transmissions, the information comprising transmission configuration information.

Note that the term "node" herein may be used to denote a physical node or a logical node. For example, an LMU node may be a hardware, middleware or a software, which may be integrated into a physical eNodeB node, may be sharing equipment of eNodeB in some examples, or may be a physically separate node from eNodeB having own receive antenna.

Current Problems with UL Positioning

There are a number of problems with UL positioning as it is currently defined in the 3GPP standards for LTE. For instance, currently it is not possible to signal the LCS QoS to an eNodeB, e.g., over LPPa. More generally, there is currently no possibility to provide the LCS QoS for a given positioning task to a radio network node at all, nor to any node which does not calculate the location of the target UE. Thus:

- It is not possible to provide the LCS QoS to a radio network node, such as the eNodeB, that is configuring a UE for UL positioning measurements by the eNodeB.
- It is not possible to provide the LCS QoS to a radio network node, such as the eNodeB, that is configuring a UE for UL positioning measurements performed by a measuring entity different from eNodeB, such as an LMU. Note that an LMU may be a logical node which may have different physical implementation, e.g., this LMU may be a standalone LMU, an LMU sharing radio with eNodeB, or an LMU integrated into the eNodeB.
- It is not possible to provide the LCS QoS to a radio network node, such a radio network node that is different from eNodeB such as LMU, e.g., for configuring measurements at the LMUs
- It is not possible to provide the LCS QoS to a radio network node for use in UL positioning and E-CID positioning or other positioning methods using E-CID measurements such as AECID, RF pattern matching, fingerprinting.
- It is not possible to provide the LCS QoS over LPPa or SLmAP.

In addition, there are presently no techniques for using the LCS QoS information in the radio network node. Still further, there is no possibility to request a confidence level in the request sent to E-SMLC, e.g., via LCS-AP. Note that this problem has consequences that are not limited to UL positioning. Even further, there are currently no techniques for ensuring positioning QoS during a cell change, in either carrier-aggregation (CA) systems or non-CA systems.

Described below, then, are technical solutions to address one or more of the problems noted above. These technical solutions include:

- Methods in the radio network node for obtaining the LCS QoS information.
- Methods in the radio network node for using the LCS QoS information.
- Methods in a positioning node
- Methods for ensuring positioning QoS during cell change.
- Enhanced signaling means for communication between positioning node and radio network node.

Obtaining and Using LCS QoS Information in a Radio Network Node

According to several embodiments, a radio network node is adapted to receive LCS QoS information from another network node. The radio network node then uses the LCS QoS information to perform at least one action responsive to the received LCS QoS information.

The LCS QoS information may be received via a direct communication link (e.g., a fixed link, a radio link, etc.) or a logical link to another network node (e.g., via higher-layer protocols that may be transparent to a third node, such as a MME or gateway node) or via a third node or UE. Receiving the information via a third node or UE may also be transparent to the third node or the UE (e.g., in a transparent container).

An example of a radio network node that may be adapted in this manner is an eNodeB, or a radio base station in general. Another example of a radio network node that may be adapted in this manner is an LMU. Examples of the network node from which the LCS QoS information is received are a positioning node (e.g., an E-SMLC or SLP), an MDT node, a gateway, a coordinating node, a core network node (e.g., an MME), an external LCS Client, and another radio network node (e.g., eNodeB or LMU). Communication between eNodeBs may be via the X2 interface standardized by 3GPP. Communication between eNodeB and LMU may be via X2 or another interface (which may also be a proprietary interface), or via another node or UE.

In one example, LCS QoS may be provided by the positioning node to an eNodeB by means of the LPPa protocol. For example, the LCS QoS information may be provided in a message that requests delivery of UE configuration data from the eNodeBs to the positioning node for support of uplink positioning, e.g., in support of UTDOA positioning. The message may be called UPLINK INFORMATION REQUEST or UTDOA INFORMATION REQUEST, for example. The message may also be an enhanced LPPa request message for supporting UL positioning (e.g., UTDOA) as described in further detail below. In another example, LCS QoS may be provided by the positioning node to LMU, e.g., by means of the SLmAP protocol.

In some cases, the LCS QoS may be obtained by the radio network node from a UE. In a special example, the LCS QoS information is received via the UE from another network node, in a transparent (to the UE) container.

The LCS QoS may be received by the radio network node in different ways and for different reasons. For example, the LCS QoS may be received upon request, or upon an indication for a need for this information sent from the radio network node. Alternatively, the LCS QoS may be unsolicited, e.g., where the sending is initiated by the sending node such as positioning node. The LCS QoS may also be sent according to a pre-defined procedure, e.g., as a part of the message flow during the information exchange related to retrieval UE configuration for UL positioning support. Combinations of these approaches are possible Transmission of the LCS QoS may also be triggered at the sending node by a particular triggering event, such as a handover, a cell change, carrier switching (e.g., with carrier aggregation), or by the receiving of a message of a pre-defined type (e.g., a location request; a location request associated with a certain positioning method, e.g., E-CID, UL positioning, UTDOA, network-based positioning; HO command). Transmission of the LCS QoS might also be triggered by a particular condition, e.g., based on a measured signal strength or quality, which may be compared to a threshold, or a measurement quality, which may be compared to a threshold, or a target position accuracy received in the positioning request has an accuracy of at least some threshold, or a target positioning QoS comprising measurement time below a threshold. Transmission of the LCS QoS might still further be triggered by a pre-defined rule, e.g., at a measurement restart after a cell change or a poor positioning result or poor-quality measurements, where "poor" may mean an error or uncertainty above a threshold. Combinations of these triggers are possible. Furthermore, a particular sending node may be configured to send the LCS QoS information in response to several of these triggering events, conditions, and/or pre-defined rules.

Receiving the LCS QoS at the radio network node may be in association with a particular positioning method, e.g., E-CID or UL positioning (e.g., UTDOA) or network-based positioning. The LCS QoS information (aka LCS QoS data) may comprise any one or more of several parameters, such as:

- horizontal accuracy (e.g., minimum horizontal accuracy or target/desired horizontal accuracy),
- confidence level corresponding to horizontal accuracy,
- vertical accuracy (e.g., minimum vertical accuracy or target/desired vertical accuracy),
- confidence level corresponding to vertical accuracy,
- response time (e.g., maximum response time or target response time),
- measurement time (e.g., maximum measurement time or target measurement time), and
- Client Type or Service Type (e.g., there may be a pre-defined set of QoS parameters for certain LCS Clients such as emergency LCS Client).

Any of the LCS QoS parameters may be represented in terms of an absolute value (e.g., in meters or nanoseconds for accuracy or in seconds or milliseconds for response time), or a coded value (e.g., an index in range 0.127 or 'low/high' indicator).

In some embodiments, the LCS QoS format is the same as that used over LCS-AP protocol (i.e., the format received by the positioning node from MME). However, in other embodiments the LCS QoS format used to send the LCS QoS information sent to the radio network node may differ from that used over the LCS-AP protocol. In the latter case, for example, the positioning node may perform a transformation operation between the two formats. This transformation may be based, for instance, on a pre-defined rule or a pre-configured table. The transformation may also comprise adding one or more parameters that are not used in the format received by the positioning node. For example, LCS QoS received by the positioning node via LCS-AP from MME does not include confidence information; a positioning node may decide to include it in the LCS QoS format transmitted by the positioning node, in some embodiments of the present invention. In the case when the LCS QoS format transmitted by the positioning node is different from the format in which the positioning node receives the LCS QoS information, a transformation may also be needed when the positioning result, obtained on the LCS QoS format transmitted by the positioning node, is to be communicated to another node, such as when the positioning result is to be sent to the LCS Client that requested the UE positioning.

In some embodiments, a particular set of LCS QoS information is associated with one UE. In other embodiments, a given set of LCS QoS information is associated with more than one UE, e.g., so that one or several parameters of the LCS information apply to multiple UEs. In still other embodiments, separate LCS QoS information associated with each of multiple UEs may be included in a single message to the radio network node. Further, the same LCS QoS set of parameters for more than one UE may be comprised in the same message (e.g., UEs may be grouped by the LCS QoS).

Once the radio network node has received the LCS QoS information, it can use it for any of several purposes, including several uses that improve the ability of the measuring node to obtain measurements that will achieve the LCS QoS requirements. For example, upon receiving the LCS QoS information the radio network node may use the LCS QoS information for configuring at least one transmission of at least one UE. Examples of uplink transmissions that may be configured, based on the LCS QoS information include reference signal transmissions (e.g., SRS transmission or demodulation reference signals transmission), data transmissions (e.g., Physical Uplink Shared Channel, or PUSCH, transmissions), random access transmissions (e.g., Physical Random Access Channel, or PRACH), control channel transmission (e.g., Physical Uplink Control Channel, or PUCCH, transmissions).

The configuring of a transmission based on the LCS QoS information may comprise scheduling the transmission, rescheduling the transmission, configuring transmission bandwidth or frequency, configuring at least one parameter related to the at least one transmission. Examples of parameters related to SRS transmissions in LTE include:

- PCI;
- UL-EARFCN;
- Duplex mode configuration;
- UL cyclic prefix;
- Cell-specific SRS bandwidth configuration srs-BandwidthConfig (see 3GPP TS 36.211);
- UE-specific SRS bandwidth configuration srs-Bandwidth (see 3GPP TS 36.211);
- number of antenna ports for SRS transmission srs-AntennaPort (see 3GPP TS 36.211);
- SRS subframe configuration (see 3GPP TS 36.211);
- frequency domain position (see 3GPP TS 36.211);
- SRS frequency hopping bandwidth configuration (see 3GPP TS 36.211);
- SRS-Cyclic shift (see 3GPP TS 36.211);
- Transmission comb (see 3GPP TS 36.211);
- SRS configuration index (see 3GPP TS 36.213);
- MaxUpPt, used for TDD only (see 3GPP TS 36.211);
- parameters related to enabling/disabling SRS sequence hopping or SRS sequence-group hopping;
- parameter related to configuring aperiodic SRS;
- transmit or measurement pattern of SRS;

Note that configuring of a transmission based on LCS QoS information may also comprise reconfiguring of an earlier configured transmission from the same UE. Configuring of a transmission may be performed according to a pre-defined rule that takes into account the received LCS QoS information. The rule may specify configuring such parameters as bandwidth (transmission or measurement bandwidth), transmission periodicity or transmission time, number of transmission samples available for measurements (e.g., a minimum number of transmission samples), etc. For example, the pre-defined rule may specify that:

- The configured bandwidth is not less than a pre-defined value, e.g., specified by a measurement requirement or a mapping table. For instance, a high accuracy requested in the received LCS information may require at least X MHz or at least Y subcarriers.
- The configured transmission periodicity is not larger than a pre-defined value, e.g., specified by a measurement requirement or a mapping table. For instance, a short measurement period requested in the received LCS information may require at most N milliseconds between two transmissions.

The configured number of transmissions is not less than a pre-defined value, e.g., specified by a measurement requirement or a mapping table. For instance, a certain accuracy level requested in the received LCS information may require at least N transmissions.

The number of transmit occasions indicated to the measuring node but where the signal is not actually transmitted (e.g., due to measurement gaps, turning off the receiver or switching it to another frequency, power consumption or transmit power reconfiguration, giving priority to other transmissions than the UL radio signal used for positioning measurements such as DL HARQ feedback transmissions transmitted in UL or PUCCH transmissions) should not exceed a certain number or a certain ratio of the total transmit occasions over a given time period. For instance, a requirement may specify that the number of subframes when the UE may suspend SRS transmissions, e.g., due to PUCCH or PUSCH or CSI transmissions, should not exceed X %. Note that the radio node responsive to such a requirement would have to adaptively schedule SRS, PUCCH, PUSCH or SCI or any DL transmission which would imply an UL transmission at a pre-defined time (e.g., due to HARQ process)

Another action that a radio network node may take in response to receiving LCS QoS information or based on obtained LCS QoS information is sending at least one of the configured transmission parameters discussed above to the UE or to another network node, such as a positioning node or another radio network node, e.g., an eNodeB or LMU.

In addition to or instead of using the LCS QoS information to configure uplink transmissions, the radio network node may also use the LCS QoS information to configure a receiver for receiving at least one transmission from at least one UE. The radio network node using the LCS QoS information for configuring its receiver and the radio network node using the LCS QoS information for configuring transmissions may be different physical nodes. The receiver of interest here may be the radio network node's own receiver or the receiver in another radio network node, such as in a separate LMU. In the latter case, configuring the receiver for receiving a transmission for one or more UEs, based on the LCS QoS information, includes Sending at least one of the parameters configured for the at least one transmission to the receiving node.

Examples of the at least one transmission for which the receiver may be configured include reference signal transmissions (e.g., SRS transmissions), data transmissions (e.g., PUSCH transmissions), and control channel transmissions (e.g., PUCCH transmission). Configuring a receiver may comprise, for example, scheduling the reception, rescheduling the reception, or configuring a reception bandwidth, measurement bandwidth, reception frequency, and/or measurement frequency. Note also that configuring of a receiver may also comprise reconfiguring of the receiver earlier configured to receive signals from the same UE.

Still another use for the LCS QoS information by a radio network node is in performing interference coordination. Thus, for example, a radio network node may be configured to do any one or more of the following:

Selectively schedule at least one transmission taking into account expected interference on the scheduled resources and the LCS QoS information. For instance, low-interference time- and/or frequency resources may be prioritized for scheduling when high accuracy and/or short measurement time is requested.

Reschedule other transmissions of the same or other UEs to enable low-interference resources responsive to the received LCS QoS information.

Selectively assign signal sequence parameters, e.g., sequence or scrambling code, hopping parameters, etc., responsive to the received LCS QoS.

Exchanging interference-related data to coordinate interference with neighbor cells or neighbor nodes for the time- and/or frequency resources that may be used for at least one transmission of the at least one UE for which the LCS QoS information was received. For instance, one radio node may indicate to the coordinating node or to the neighbor node a need to reduce interference from the neighbor cell or the neighbor node.

Still another use for the LCS QoS information by a radio network node is in initiating a handover or carrier switching procedure for at least one UE, responsive to the received LCS QoS information. For example, the UE for which the LCS QoS information was received may be handed over to another cell, to another carrier frequency, or to another RAT. Techniques related to this use are discussed in further detail below.

Finally, another use the LCS QoS information by a radio network node is in reporting a change in UE transmission configuration, including a termination of a particular UE transmission. The termination may occur, e.g., due to a cell change or resource optimization at the eNodeB, such as when other UEs' transmissions may be prioritized. Or, a termination may be due to a UE state change, or an eNodeB state change, or a cell state change, such as when a UE or eNodeB or cell changes between active and low-activity states such as DRX, DTX, power-saving, reduced transmission activity state, reduced-power activity state, etc.

Knowing the LCS QoS, the eNodeB according to some embodiments may also be adapted to determine the minimum required transmission configuration corresponding to the requested LCS QoS, including the transmission periodicity, bandwidth, number of transmissions, etc. In some of these embodiments, the eNodeB is adapted to report an early termination of UE transmissions in cases where the termination is determined to be early based on the LCS QoS and the transmissions that have been used for the measurement (e.g., during the time elapsed from configuring the transmissions to when the transmissions are reconfigured or stopped).

Knowing the LCS QoS, the eNodeB according to some embodiments may also be adapted to report a transmission configuration change that does not meet a minimum configuration requirement, e.g., has smaller BW and/or fewer transmissions available for measurements and/or larger periodicity, or to report a changed transmission configuration that is not a superset of the old configuration, e.g., where transmissions are more sparse with the new configuration. Either of these scenarios may cause positioning QoS degradation, and thus the eNodeB may inform another node (such as a positioning node) about such transmission configuration change. If a new configuration meets the minimum requirement and/or is a superset of the old configuration, on the other hand, e.g., the new bandwidth is larger than the minimum or the previous one or the transmissions become more dense while the old-configuration transmissions also occur or the number of transmissions is increased, there is no need to inform positioning node about the reconfiguration.

Ensuring LCS QoS During a Cell Change

LCS QoS information obtained by a radio network node can be used to help ensure that LCS QoS requirements are met during and after a cell change. Note that the techniques described here may be applied in combination with any of the solutions described above, and may further be combined with any of the signaling solutions described herein.

Here, the term "cell change" refers to a change in a cell or cells with which a UE is associated. Examples of a cell change include:
- a serving cell change, e.g., at handover in a non-CA system or when the UE is not configured with any SCell;
- a serving cell set change, e.g., an addition, removal, or change of a Scell in a CA system;
- a PCell change, e.g., in a CA system, a change from a current PCell, having a first cell identity, to another cell, with a second cell identity;

A cell change may occur during:
- a handover (intra-frequency, inter-frequency or inter-RAT); or
- a PCell change on the same PCC (in a CA system); or
- an SCell change on a SCC (in a CA system); or
- a carrier switching event, in which the current PCC is changed to another carrier frequency, which also implies a PCell change.

A cell change may be due to any of several reasons, e.g., mobility, load balancing, energy saving, carrier activation/deactivation, etc.

According to several of the techniques described earlier, an eNodeB may be adapted to inform a positioning node when the configured SRS transmissions used for UL positioning are no longer available. This allows the positioning node to make a more informed choice as to how to proceed with the positioning request. Current positioning technologies do not take into account cell change scenarios arising in a carrier aggregation system, for example. Any of the cell changes described above is associated with the termination of an uplink transmission. As a result, the UL positioning measurements are likely to be restarted to meet the requested LCS QoS which will increase the response time.

However, when the UE is in carrier aggregation, the UL positioning measurements can continue at least in some cases where a cell change occurs, and thus the UL measurements may continue, at least in some cases. Accordingly, in some embodiments of the present invention, an eNodeB is adapted to inform a positioning node about a cell change only when UL transmissions cannot continue. The eNodeB may also be configured to indicate the type of a cell change and/or the change for a specific cell, e.g., PCell_old→PCell_new. In addition, or as an alternative, the positioning node may be configured to not request a restarting of UL positioning measurements for the UL transmissions (on all CCs or a subset of CCs which have been measured for positioning prior the cell change) in situations where UL measurements can continue after a cell change. In addition, or as still another alternative, the positioning node may be adapted to not inform the measuring nodes about a cell change when the UL transmissions can continue. As still another alternative, a measuring node performing UL positioning measurements (e.g., an eNodeB or an LMU) may be adapted to continue UL positioning measurements after a cell change (if the UL transmissions can continue) for a UE for which the measurements are being performed.

Such cases where measurements may continue after a cell change include, for example, the case when no SRS are configured on a serving cell that is changed. (Recall that there may be multiple serving cells with CA.) Other examples include when a cell change involves a serving cell that was previously receiving SRS transmissions, when the UL transmissions may continue on other serving cells.

In some embodiments of the present invention, when a cell change occurs, the eNodeB may provide the positioning node with the new or updated configuration of UL transmissions for one or more serving cells. This configuration information may be included in the same message that contains the indication about the cell change. This approach may apply for a UE in CA or non-CA UE, since, for example, co-located cells may be aware of the intra-site HO or connection reconfiguration and may also be aware of the transmission configuration in the other cell of the site, e.g., via cross-layer communication.

In still other embodiments, when a cell change occurs, e.g., due to a handover, the eNodeB may provide to the target cell (e.g., in the handover command message) an indication about the on-going positioning session. The indication may also comprise the LCS QoS information. This approach may be applied in both uplink and downlink positioning scenarios. With this approach:
- sending the LCS QoS information to the new cell for the UE from the positioning node may be avoided, thus reducing unnecessary signaling overhead; and/or
- the target cell/eNodeB (new cell/eNodeB) may configure UL UE transmissions adaptively to the received LCS QoS information, and the delay until when the target eNodeB (new eNodeB after the cell change) configures the UE transmissions may be reduced; and/or
- the target cell/eNodeB (new cell/eNodeB) may configure downlink transmissions adaptively to the received LCS QoS information, thereby reducing the positioning response time; and/or
- the target cell/eNodeB (new cell/eNodeB) may provide the positioning node with the new configuration of UE transmissions without a request from the positioning node, which may reduce the overall positioning response time and signaling overhead; and/or
- the target cell/eNodeB (new cell/eNodeB) may provide the positioning node with its configuration of downlink transmissions without a request from the positioning node, which may reduce the overall positioning response time and signaling overhead.

Several of the above techniques may be used alone or in combination with one another to improve positioning QoS, e.g., accuracy and/or response time, when a cell change occurs. Some of the techniques may also apply for non-CA systems, and several are not limited to UL positioning (note also that some measurements involve both DL and UL transmissions, e.g., RTT or Rx-Tx measurements). Further, the UL transmissions are not limited to SRS transmissions, which were used as a non-limiting example above.

It should be appreciated that a positioning node according to some embodiments of the invention is adapted to receive LCS QoS information and to send positioning QoS information to one or more radio network nodes, such as to one or more eNodeBs and/or one or more LMUs. As noted above, the positioning QoS information may be the same as the LCS QoS information, in some embodiments. In others, however, the positioning node may transform the LCS QoS information to produce the positioning QoS information. This may be a change in format, in some cases. In some embodiments, the positioning node may selectively determine which positioning QoS information to select and/or derive from the LCS QoS information, based on, for example, the expected use of the positioning QoS information by the radio network node to which the information is being sent. For instance, the positioning node may send one set of positioning QoS information to an eNodeB that is configuring uplink transmissions for one or more mobiles, but that is not performing measurements, while sending another to a measuring node that will use the information to configure a measurement receiver. In some cases, the positioning node may be further adapted to combine different positioning QoS information for two or more target wireless devices in a single message or group of messages. In some embodiments, the positioning node may be still further adapted to send positioning QoS information that relates to and is common for several target wireless devices.

The positioning node may be triggered to send the positioning QoS information in any of several different manners, such as by a request from a radio network node, or by a location request. Other predetermined rules and/or conditions may also trigger the sending of positioning QoS information. In some embodiments, a positioning node may be configured to update positioning QoS information or other information sent to a radio network node based on reports it receives from that node or from other nodes. For instance, a positioning node in some embodiments may be configured to update positioning QoS information or other information and sent that updated information to an LMU, based on cell change information or uplink transmission configuration information received from an eNodeB.

Enhanced LPPa for Supporting UL Positioning (e.g., UTDOA)

LPPa messaging for supporting UL positioning (e.g., UTDOA) or for a specific UL measurement (e.g., UL RTOA), is currently unspecified. In particular, the information exchange messages associated with UL transmissions are not yet finalized for uplink positioning. Here, parameters that potentially may be signalled in this message and predefined rules that may be associated with this message are described in more detail. Note that this message may also contain LCS QoS information, including any of the detailed information described above.

UL positioning-related information for more than one UE may be included in the same message. Further, the same set of parameters for more than one UE may be included in the same message. For example, a list of UEs may be provided together with the list of the parameters that apply for all UEs in the list.

An LPPa message for UL positioning (e.g., a "request information" message or a "provide additional information" message) may include one or more of several features. For instance, such a message may include a request to configure a UE for UL positioning, e.g., comprising any one or more of:
  a request to configure a UE for UL positioning on specific carrier frequency(-ies) or specific component carrier(s) (CC in carrier aggregation) or specific RAT (which may or may not be the same as RAT in which the LPPa request message is received),
  a request to configure a UE for UL positioning on the entire set or a subset of carrier frequencies/CCs/RATs indicated in the message,
  a request to configure a UE for UL positioning on specific time domain resources,
  a request to configure a UE for UL positioning on specific frequency domain resources, Requested time- and/or frequency resources may be provided in an ordered list according to priorities, such as an ordered list of frequencies where the frequency priorities are decided based on the radio interface load (e.g., high transmission activity in the area may cause high interference and thus high load) and/or based on availability of assistance measuring nodes (e.g., LMUs). Requested/indicated set of time- and/or frequency resources may be determined based on the capabilities (e.g., frequency support or CA capability) of the assisting measuring nodes (e.g., LMUs) selected for UL positioning.

As another example, an LPPa message for UL positioning may include a request for UE configuration information for UL transmissions to be transmitted by the UE. For instance, this configuration information might be requested by the positioning node, in some embodiments. Another example of information that may be included in an LPPa message is an indication that pseudo ID or UE-specific SRS configuration may be used for UTDOA. For example, not all LMUs may be capable of using pseudo ID or UE-specific SRS; E-SMLC may thus obtain, by requesting or in unsolicited way from LMU or another node, this LMU capability and then determine accordingly the indication setting.

Still another example is an indication that a specific SRS configuration type is allowed, or an indication that a specific SRS configuration type is to be avoided. Some non-limiting examples of specific SRS configurations that might be referenced in this way are aperiodic SRS, SRS sequence hopping, and power-controlled SRS (with power control decoupled from PUSCH, e.g., a non-zero offset with respect to PUSCH). In some cases, no SRS configuration restriction is assumed by default, i.e., in the absence of a contrary indication received in an LPPa message. Note that a positioning node, in some embodiments according to this approach, determines whether SRS configuration restriction(s) are to be indicated to the configuring node (e.g., a serving eNodeB), based on assisting measuring node/LMU capability obtained from the measuring nodes/LMUs or other nodes, whether on request or pro-actively.

Yet other examples of information that may be included in an LPPa message for UL positioning include:
  an indication of the maximum measurement bandwidth (associated with a frequency) that may be configured for UL positioning. For instance, an E-SMLC selects a set of assisting LMUs and/or eNodeBs for measuring UE transmissions and determines the maximum supported measurement bandwidth among the assisting LMUs and/or eNodeBs. In some cases, this indication may be included in the message only when the maximum measurement bandwidth is smaller than the UL system bandwidth of the serving eNodeB, to reduce signalling overhead.
  a request for velocity information.
  a request for environment information, such as whether the environment is line-of sight or multi-path rich, or has urban- or rural-like propagation, or whether the deployment of the eNodeB is indoor or outdoor deployment.
  a request for a specific measurement. Some examples are a timing measurement (e.g., UE or eNodeB Rx-Tx, RTT, timing advance, etc.), a power-based measurement of signal (e.g., RSRP or received signal strength in UL, received signal quality in DL or DL), an interference measurement (e.g., RSSI or Iot), a direction measurement (e.g., AoA), and a power headroom measurement. Note that the requested measurement may be for the downlink or the uplink or both (note that, e.g., RTT and Rx-Tx are two-directional measurements), and/or may be an intra-frequency, inter-frequency, inter-RAT, or carrier aggregation measurement (e.g., a measurement on an SCell), or a CoMP measurement.
- a request for complementary ranging information. An example of complementary ranging information may be a measurement reflecting a distance or a propagation delay such as timing advance, timing advance Type 1 (see 3GPP TS 36.214), timing advance Type 2 (see 3GPP TS 36.214), UE Rx-Tx, eNodeB, Rx-Tx, RTT, etc.
- a request for radio channel related data.
- a request for radio fingerprint information, such as received signal strength in UL or DL, received signal quality in UL or DL, etc.

Any of the above information may be implicit, or explicitly signaled, and may be associated with one or a plurality of request messages. For example, an explicit request may comprise a corresponding indicator included in the request message. An implicit request may be determined by a pre-defined rule (i.e., no explicit indicator in the request message may be necessary). For example, such a pre-defined rule may specify that a timing advance measurement on PCell should always be included when available, or that available fingerprint information may be included if a particular timing measurement is not available.

Any of the above information may be provided by positioning node to eNodeB, for any of one or several reasons or schedules. For instance, the information may be provided:
- pro-actively.
- according to a pre-defined procedure, e.g., as a part of the message flow during the information exchange related to retrieval UE configuration for UL positioning support. For instance, the information may be sent as a part of a request to configure UL transmissions for positioning a UE.
- upon a request for or an indication of a need for this information from eNodeB. For instance, an eNodeB may send a request for additional information, if necessary, after receiving a request to configure UL transmissions for positioning a UE.
- upon one or several particular triggering events, such as a handover or SRS configuration change or suspension. Note that a positioning node, for example, may be notified about such event by a network node, such as by an MME via LCS-AP, or by a serving eNodeB handing over a UE, or by a serving eNodeB receiving a handed over UE, e.g., via LPPa. Such a notification may include new SRS configuration, in some cases.
- to facilitate SRS configuration in a new cell upon a cell change. For instance, old SRS configuration may be signalled to a target cell, e.g., in a HO command). The positioning node may be notified about such event by a UE, for example, via LPP. The notification about such event may comprise new SRS configuration, in some cases.
- upon a failure of another positioning method.
- upon one or more triggering conditions, such as when the obtained UL positioning measurements on a certain frequency are of a low quality, or when the received SRS configuration does not meet a pre-defined rule, such as when the configured bandwidth provided by the eNodeB is below a pre-defined threshold and/or the configured periodicity or SRS transmission time is below a pre-defined threshold, where the pre-defined thresholds may be pre-defined based on measurement requirements. In some cases, upon such a trigger, positioning node may send a request with updated information, e.g., a new set of frequencies In view of the several techniques described above, it will be appreciated that FIG. 2 illustrates, in general terms, an example method for assisting positioning of a target UE, as might be implemented in a radio network node, such as an eNodeB or an LMU.

Figure 2:
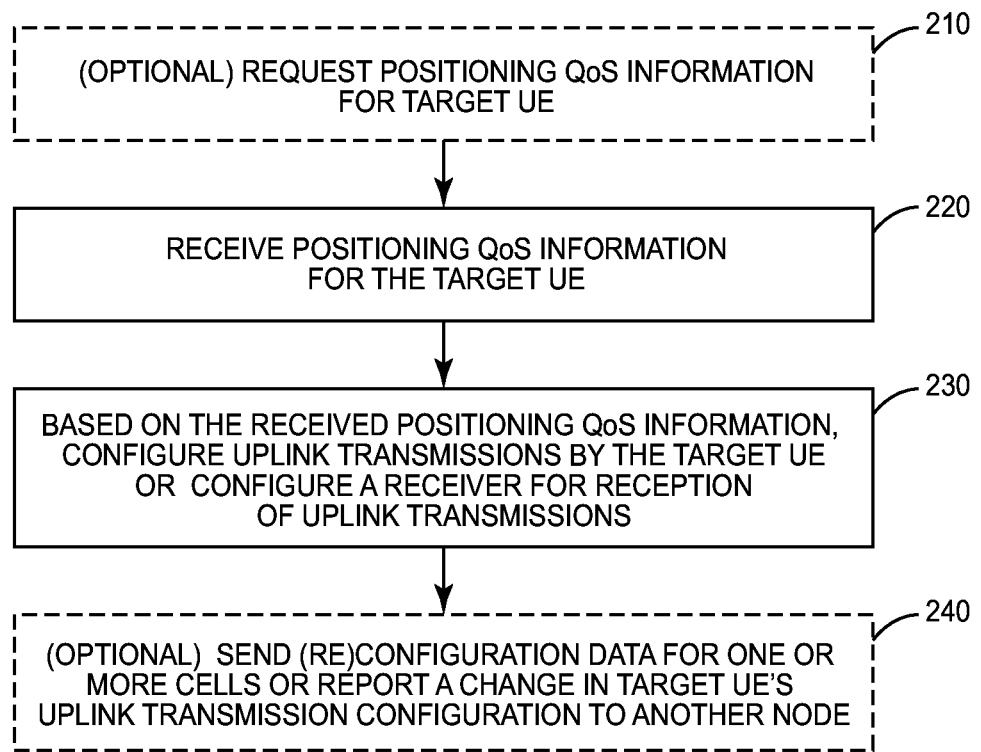
FIG. 2 is a process flow diagram illustrating an example method according to some embodiments of the present invention.

The process illustrated in FIG. 2 begins, as shown at block 210, with a request for positioning QoS information for target UE. This request may be sent, for example, to a positioning node, such as an E-SMLC or an SLP. However this request is not necessarily sent by every radio network node configured according to embodiments of this invention, nor is it necessarily sent for every positioning transaction in radio network nodes that are configured to at least sometimes send this request. For that reason, this requesting operation is illustrated as "optional" in FIG. 2.

As shown at block 220, the process of FIG. 2 continues (or begins, in the event that no previous request has been sent) with the receiving of positioning QoS information for the target UE. Note that at least in the context of LTE, the positioning QoS information may be identical to LCS QoS information associated with an LCS positioning session, or may be directly derived from it. This positioning QoS information may be received from any one of several nodes, such as a positioning node, a core network node, another radio network node, the target UE, or a second UE. In some cases, for example, the positioning QoS information is received from a positioning node, using the LPPa protocol. In some cases, the positioning QoS information is included in an information element or a message associated with uplink positioning. In some of these and in some other cases, the positioning QoS information is received in a message that requests or indicates a need for delivery of UE transmission configuration data to a positioning node. The positioning QoS information may include any one or more of the following, for example: a desired horizontal accuracy; a desired vertical accuracy; a confidence level corresponding to horizontal accuracy; a confidence level corresponding to vertical accuracy; a maximum response time; a target response time; a maximum measurement time; a target measurement time; a positioning client type; and a positioning service type.

As shown at block 230, the received positioning QoS information is used to configure uplink transmissions to be transmitted by the target UE, or to configure a receiver for reception of one or more uplink transmissions from the target UE, or both. In some cases, one or more parameters are received by the radio network node in addition to the positioning QoS information, such as parameters specifying specific time resources, specific frequency-domain resources, component carrier information, RAT information, and/or maximum measurement bandwidth information. In some of these embodiments, the configuring of the one or more uplink transmissions or the configuring of the receiver is further based on these one or more additional parameters.

In some embodiments, the configuring of one or more uplink transmissions that are to be transmitted by the target UE includes configuring a reference signal transmission, such as a sounding reference signal (SRS) transmission. In some of these and in others, a data transmission is configured. Configuring this reference signal transmission may include, for example, scheduling the reference signal transmission, or configuring one or more of the following for the reference signal transmission: a transmission bandwidth or frequency; a duplex mode configuration; a cyclic prefix; a number of antenna ports; a frequency hopping configuration;

a subframe configuration; a transmission comb; a reference signal sequence; a parameter indicative of reference signal periodicity; a reference signal cyclic shift; a parameter related to the sequence hopping; a reference signal scrambling code; and a reference signal configuration index.

In some of these and in some other embodiments, the configuring of one or more uplink transmissions or the configuring of a receiver to receive uplink transmissions is based on a pre-defined rule that takes into account the received positioning QoS information. This pre-defined rule defines one or more of the following, in some embodiments: a transmission bandwidth, a measurement bandwidth, a transmission periodicity, a transmission time, and a number of transmission samples for measurements. In some of these and in still other embodiments, the configuring of one or more uplink transmissions further includes adaptively scheduling an uplink transmission or a downlink transmission that causes an uplink transmission at a pre-defined time.

In some embodiments that involve configuring a receiver for reception of one or more uplink transmissions that are transmitted by the target UE, uplink transmission configuration information is sent to a measuring node. This may be the case, for example, where the positioning QoS is received by an eNodeB and is used to configure a separate measuring node, such as an LMU, to receive uplink transmissions from the target UE. Whether or not the radio network node is configuring its own receiver or a separate receiver, however, the configuration may involve any of the following, in some embodiments: scheduling reception of one or more of the uplink transmissions; rescheduling reception of one or more of the uplink transmissions; configuring a reception bandwidth or frequency; and/or configuring a measurement bandwidth or frequency.

As shown at block 240, some, but not all, methods further include performing one or more additional actions, based on the received positioning QoS information. Examples of these additional actions include: interference coordination, initiating handover of a UE or carrier switching of a UE, sending uplink transmission configuration information or reconfiguration information for one or more cells to a measuring node or to another network node, and reporting a change in uplink transmission configuration to another network node. Note that the examples shown in block 240 of FIG. 2 may be particularly appropriate for an eNodeB. Other radio network nodes, such as a standalone LMU, may likewise be adapted to carry out one or more additional actions, based on the received positioning QoS information, such as performing at least one measurement using the (re)configured receiver and reporting the measurement to a positioning node.

Although the techniques described above may be implemented in any appropriate type of telecommunication system, supporting any suitable communication standards and using any suitable components, particular embodiments of the described solutions may be implemented in an LTE network, such as that illustrated in FIG. 1.

The example network may further include any additional elements suitable to support communication between wireless devices or between a wireless device and another communication device (such as a landline telephone). Although each of the illustrated network nodes in FIG. 1 may represent a network communication device that includes any suitable combination of hardware and/or software, these network nodes may, in particular embodiments, represent a device such as the example network node 300 illustrated in FIG. 3. Similarly, although the illustrated base station nodes may represent network nodes that includes any suitable combination of hardware and/or software, these network nodes and other radio network nodes may, in particular embodiments, represent devices such as the example radio network node 400 illustrated in FIG. 4.

Figure 3:
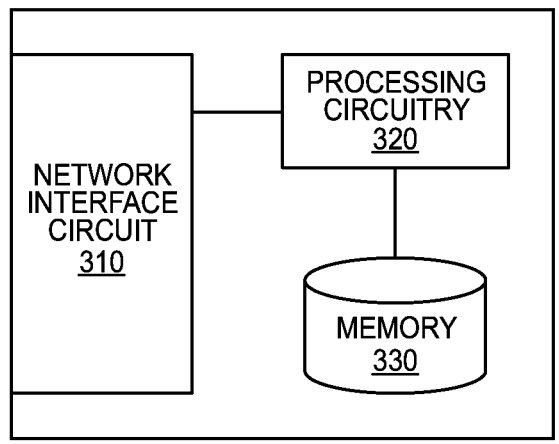
FIG. 3 is a block diagram illustrating several components of an example network node, such as a positioning node, according to some embodiments of the present invention.

As shown in FIG. 3, the example network node 300 includes processing circuitry 320, a memory 330, and network interface circuitry 310. In particular embodiments, some or all of the functionality described above as being provided by a network node may be provided by processing circuitry 320 executing instructions stored on a computer-readable medium, such as the memory 330 shown in FIG. 3. Alternative embodiments of the network node 300 may include additional components beyond those shown in FIG. 3 that may be responsible for providing certain aspects of the node's functionality, including any of the functionality described above and/or any functionality necessary to support the solution described above.

Figure 4:
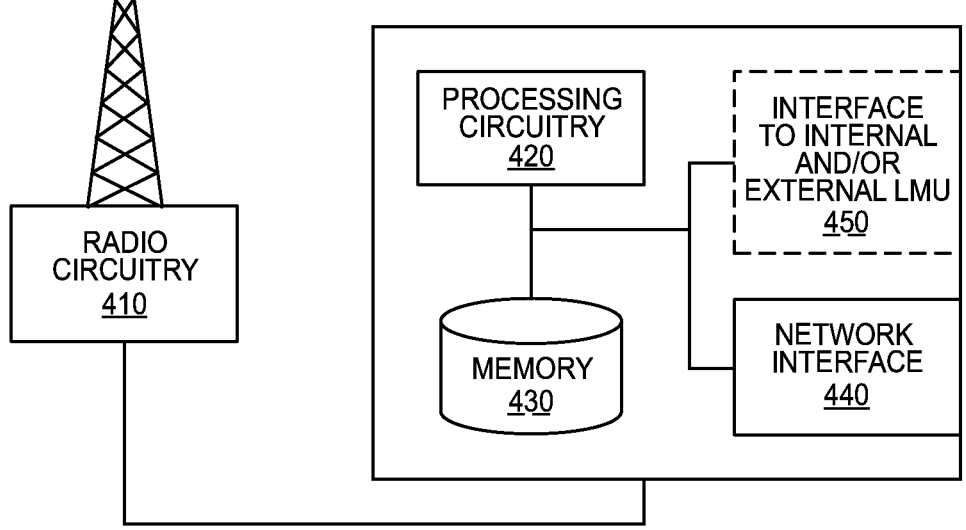
FIG. 4 illustrates components of an example radio network node according to several embodiments of the present invention.

As shown in FIG. 4, an example radio network node 400 includes processing circuitry 420, a memory 430, radio circuitry 410, and a network interface 440. The processing circuitry 420 may comprise additional radio-frequency circuitry and baseband processing circuitry (not shown). In particular embodiments, some or all of the functionality described above as being provided by a mobile base station, a base station controller, a relay node, a NodeB, an enhanced NodeB, an LMU, and/or any other type of mobile communications node may be provided by the processing circuitry 420 executing instructions stored on a computer-readable medium, such as the memory 430 shown in FIG. 4. Alternative embodiments of the network node 400 may include additional components responsible for providing additional functionality, including any of the functionality identified above and/or any functionality necessary to support the solution described above.

For example, a radio network node 400 configured according to some embodiments of the present invention includes radio circuitry 410 adapted for radio communication with the target UE and/or to receive and measure uplink transmissions from the target UE, a network interface 440 adapted for communication with one or more other network nodes, and processing circuitry 420, as shown in FIG. 4. More particularly, the processing circuitry 420 in several embodiments is adapted to receive positioning QoS information for the target UE and, based on the received positioning QoS information, configure one or more uplink transmissions by the target UE, using the radio circuitry 410, or configure a receiver for reception of one or more uplink transmissions that are transmitted by the target UE, or both. In other words, the processing circuitry 420 in radio network node 400 may be configured, in several embodiments of the invention, to carry out any or several of the methods described above in connection with FIG. 2.

The radio network node 400 of FIG. 4 may be configured to operate as a base station according to Release 11 specifications for LTE, in some cases. In general, a base station communicates with access terminals and is referred to in various contexts as an access point, Node B, Evolved Node B (eNodeB or eNB) or some other terminology. Although the various base stations discussed herein are generally described and illustrated as though each base station is a single physical entity, those skilled in the art will recognize that various physical configurations are possible, including those in which the functional aspects discussed here are split between two physically separated units. Thus, the term "base station" is used herein to refer to a collection of functional elements (one of which is a radio transceiver that communicates wirelessly with one or more mobile stations), which may or may not be implemented as a single physical unit.

In some cases, radio network node 400 includes an additional interface 450, adapted for communications with an internal or external LMU function, or both. This additional interface 450 may include circuitry and/or programmed logic that is additional to network interface 440, in some cases, or may comprise functionality added to the circuitry and/or programmed logic used to implement network interface 440. When configured as a base station, radio network node 400 may include an integrated LMU, or may share one or more components with an LMU, and/or may communicate with a standalone LMU via additional interface 450. In any of these cases, the processing circuitry 420 may be further configured to carry out the necessary communications between the base station functionality of radio network node 400 and the LMU functionality.

In other embodiments, radio network node 400 of FIG. 4 is configured to operate as an LMU or other radio signal measurement unit. In this case, radio network node 400 may include radio circuitry 410 that is adapted only for receiving and measuring uplink transmissions from UEs, in some cases. As noted earlier, an LMU may be integrated with an eNodeB, or share one or more components with an eNodeB, or may be standalone; in any of these cases, an LMU configured as shown in FIG. 4 is adapted to communicate with an eNodeB and/or a positioning node, e.g., using network interface 440.

Referring again to FIG. 4, it should be appreciated that radio circuitry 410 includes receiver circuits and/or transmitter circuits that use known radio processing and signal processing components and techniques, typically according to a particular telecommunications standard such as the 3GPP standard for LTE and/or LTE-Advanced. In some cases, radio network node may be a measurement node that includes only radio receiver circuitry, and not radio transmitter circuits. In either case, because the various details and engineering trade-offs associated with the design and implementation of such circuitry are well known and are unnecessary to a full understanding of the invention, additional details are not shown here.

Processing circuitry 420 may include one or more microprocessors or microcontrollers, as well as other digital hardware, which may include digital signal processors (DSPs), special-purpose digital logic, and the like. Either or both of the microprocessor(s) and the digital hardware may be configured to execute program code stored in memory, along with radio parameters. The program code stored in this memory, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the several techniques described above. Again, because the various details and engineering tradeoffs associated with the design of processing circuitry for wireless base stations and other wireless devices are well known and are unnecessary to a full understanding of the invention, additional details are not shown here.

Accordingly, in various embodiments of the invention, processing circuits, such as the processing circuits 420 of FIG. 4, are configured to carry out one or more of the techniques described above for assisting in the positioning of a target UE. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

Several advantages may be achieved using the various techniques and apparatus described above. These advantages include, but are not limited to:

- More accurate UL timing measurements for positioning and position calculation
- LCS QoS information made available to the radio network node
- Methods for using LCS QoS information by the radio network node are provided
- Improved positioning QoS during a cell change Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation. The present embodiments are thus to be considered in all respects as illustrative and not restrictive.

What is claimed is:

1. A method, in a radio network node, for assisting positioning of a target wireless device, the method comprising:
   receiving, at the radio network node, positioning quality-of-service (QoS) information for the target UE; and
   based on one or more parameters included in the positioning QoS information, configuring one or more uplink transmissions for the target wireless device or configuring a receiver for reception of one or more uplink transmissions that are transmitted by the target wireless device, or both.

2. The method of claim 1, wherein the positioning QoS information is received from any of the following: a positioning node, a core network node, a second radio network node, the target wireless device, and a user equipment other than the target wireless device.

3. The method of claim 2, wherein the positioning QoS information is received from a positioning node, using the LTE Positioning Protocol Annex (LPPa).

4. The method of claim 2, wherein the positioning QoS information is received from a positioning node, using the SLm Application Protocol (SLmAP).

5. The method of claim 2, wherein the positioning QoS information is included in an information element or message associated with uplink positioning techniques.

6. The method of claim 1, wherein the positioning QoS information is received in a message that requests or indicates a need for delivery of UE transmission configuration data to a positioning node.

7. The method of claim 1, further comprising first requesting the positioning QoS information, wherein said positioning QoS is received in response to said requesting.

8. The method of claim 1, wherein the positioning QoS information comprises one or more of the following: a desired horizontal accuracy; a desired vertical accuracy; a confidence level corresponding to horizontal accuracy; a confidence level corresponding to vertical accuracy; a maximum response time; a target response time; a maximum measurement time; a target measurement time; a positioning client type; and a positioning service type.

9. The method of claim 1, further comprising receiving one or more additional parameters in addition to the positioning QoS information, the one or more additional parameters comprising one or more of:
specific time resources;
specific frequency-domain resources;
component carrier information;
radio-access technology (RAT) information; and
maximum measurement bandwidth information;
wherein said configuring one or more uplink transmissions or configuring a receiver is further based on the one or more additional parameters.

10. The method of claim 1, wherein the positioning QoS information contains first QoS information for the target wireless device and additional QoS information for each of one or more additional wireless devices.

11. The method of claim 1, wherein the positioning QoS information comprises at least one parameter that applies to the target wireless device and to one or more additional wireless devices.

12. The method of claim 1, wherein configuring one or more uplink transmissions that are transmitted by the target wireless device comprises configuring a reference signal transmission.

13. The method of claim 12, wherein configuring a reference signal transmission comprises at least one of scheduling the reference signal transmission or configuring one or more of the following for the reference signal transmission: a transmission bandwidth or frequency; a duplex mode configuration; a cyclic prefix; a number of antenna ports; a frequency hopping configuration; a subframe configuration; a transmission comb; a reference signal sequence; a parameter indicative of reference signal periodicity; a reference signal cyclic shift; a parameter related to the sequence hopping; a reference signal scrambling code; and a reference signal configuration index.

14. The method of claim 1, wherein said configuring of one or more uplink transmissions or said configuring of a receiver is based on a pre-defined rule that takes into account the received positioning QoS information, wherein said pre-defined rule defines one or more of: a transmission bandwidth, a measurement bandwidth, a transmission periodicity, a transmission time, a number of transmission samples for measurements, and a maximum number of transmit occasions indicated to the measuring node in which the signal may be not transmitted.

15. The method of claim 1, wherein said configuring of one or more uplink transmissions further comprises scheduling an uplink transmission or a downlink transmission that causes an uplink transmission at a pre-defined time.

16. The method of claim 1, wherein said method comprises configuring one or more uplink transmissions by the target wireless device by configuring a data transmission.

17. The method of claim 1, wherein said method comprises configuring a receiver for reception of one or more uplink transmissions that are transmitted by the target wireless device by sending uplink transmission configuration information to a measuring node.

18. The method of claim 1, further comprising performing one or more of the following, based on the received positioning QoS information: interference coordination, initiating handover of a UE or carrier switching of a UE, sending uplink transmission configuration information to a measuring node or to another network node, and reporting a change in uplink transmission configuration to another network node.

19. The method of claim 1, wherein said method comprises configuring a receiver for reception of uplink transmissions by one or more of:
scheduling reception of one or more of the uplink transmissions;
rescheduling reception of one or more of the uplink transmissions;
configuring reception bandwidth;
configuring frequency; and
configuring measurement bandwidth.

20. A radio network node configured to assist positioning of a target wireless device, the radio network node comprising radio circuitry adapted for radio communication with the target wireless device, a network interface adapted for communication with one or more other network nodes, and processing circuitry, wherein the processing circuitry is adapted to:
receive positioning quality-of-service (QoS) information for the target wireless device; and,
based on one or more parameters included in the received positioning QoS information, configure one or more uplink transmissions for the target wireless device, using the radio circuitry, or configure a receiver for reception of one or more uplink transmissions that are transmitted by the target wireless device, or both.

21. The radio network node of claim 20, wherein the processing circuitry is adapted to receive the positioning QoS information from at least one of the following: a positioning node, a core network node, a second radio network node, the target wireless device, and a user equipment other than the target wireless device.

22. The radio network node of claim 21, wherein the processing circuitry is adapted to receive the positioning QoS information from a positioning node, via the network interface, using the LTE Positioning Protocol Annex (LPPa).

23. The radio network node of claim 21, wherein the processing circuitry is adapted to receive the positioning QoS information from a positioning node, via the network interface, using the SLm Application Protocol (SLmAP).

24. The radio network node of claim 20, wherein the processing circuitry is further adapted to first request the positioning QoS information from another network node.

25. The radio network node of claim 20, wherein the processing circuitry is adapted to receive positioning QoS information comprising at least one of the following: a desired horizontal accuracy; a desired vertical accuracy; a confidence level corresponding to horizontal accuracy; a confidence level corresponding to vertical accuracy; a maximum response time; a target response time; a maximum measurement time; a target measurement time; a positioning client type; and a positioning service type.

26. The radio network node of claim 20, wherein the processing circuitry is adapted to receive one or more additional parameters in addition to the positioning QoS information, the one or more additional parameters comprising one or more of:

specific time resources;
specific frequency-domain resources;
component carrier information;
radio-access technology (RAT) information; and
maximum measurement bandwidth information;
and wherein the processing circuitry is adapted to configure one or more uplink transmissions or to configure a receiver based further on the one or more additional parameters.

27. The radio network node of claim 20, wherein the processing circuitry is adapted to configure the one or more uplink transmissions by configuring a reference signal transmission.

28. The radio network node of claim 27, wherein the processing circuitry is adapted to configure the one or more uplink transmissions by scheduling the reference signal transmission or by configuring one or more of the following for the reference signal transmission, or both: a transmission bandwidth or frequency; a duplex mode configuration; a cyclic prefix; a number of antenna ports; a frequency hopping configuration; a subframe configuration; a transmission comb; a reference signal sequence; a parameter indicative of reference signal periodicity; a reference signal cyclic shift; a parameter related to the sequence hopping; a reference signal scrambling code; and a reference signal configuration index.

29. The radio network node of claim 20, wherein the processing circuitry is adapted to configure the one or more uplink transmissions or configure the receiver based on a pre-defined rule that takes into account the received positioning QoS information, wherein said pre-defined rule defines one or more of: a transmission bandwidth, a measurement bandwidth, a transmission periodicity, a transmission time, a number of transmission samples for measurements, and a maximum number of transmit occasions indicated to the measuring node in which a signal may be not transmitted.

30. The radio network node of claim 20, wherein the processing circuitry is adapted to configure the one or more uplink transmissions by adaptively scheduling an uplink transmission or a downlink transmission that causes an uplink transmission at a pre-defined time.

31. The radio network node of claim 20, wherein the processing circuitry is adapted to configure the receiver for reception of uplink transmissions by one or more of:
scheduling reception of one or more of the uplink transmissions;
rescheduling reception of one or more of the uplink transmissions;
configuring reception bandwidth;
configuring frequency; and
configuring measurement bandwidth.

32. The radio network node of claim 20, wherein the processing circuitry is adapted to perform one or more of the following, based on the received positioning QoS information: interference coordination, initiating handover of a UE or carrier switching of a UE, sending uplink transmission configuration information to a measuring node or to another network node, and reporting a change in uplink transmission configuration to another network node.

33. The radio network node of claim 20, wherein the processing circuitry is further adapted to report a change in the target wireless device's uplink transmission configuration to a positioning node.

* * * * *